July 17, 1956
S. FISHMAN
2,754,724
OPHTHALMIC MOUNTING
Filed March 7, 1951
2 Sheets-Sheet 2
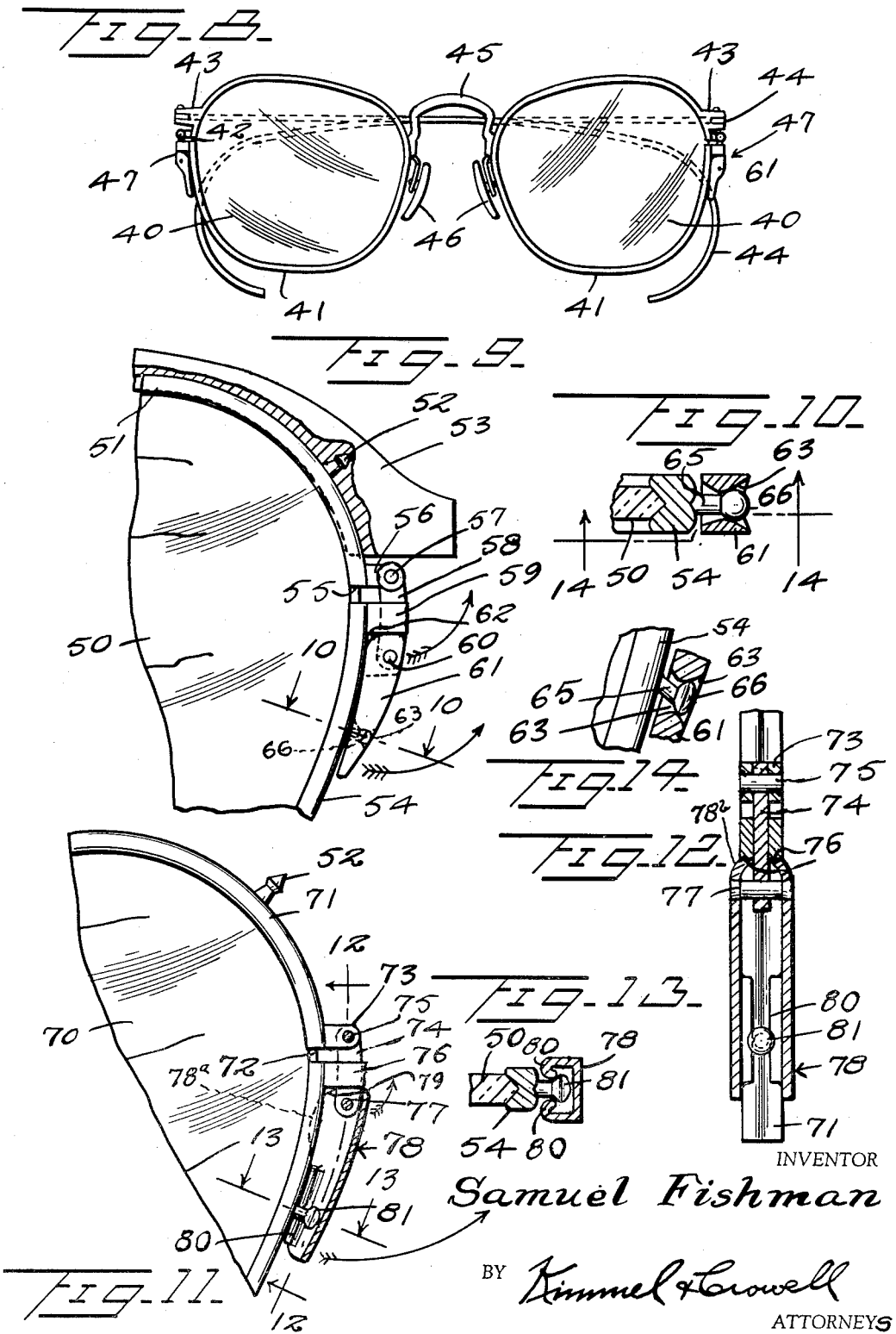
INVENTOR
Samuel Fishman
BY Kimmel & Crowell
ATTORNEYS United States Patent Office 2,754,724
Patented July 17, 1956

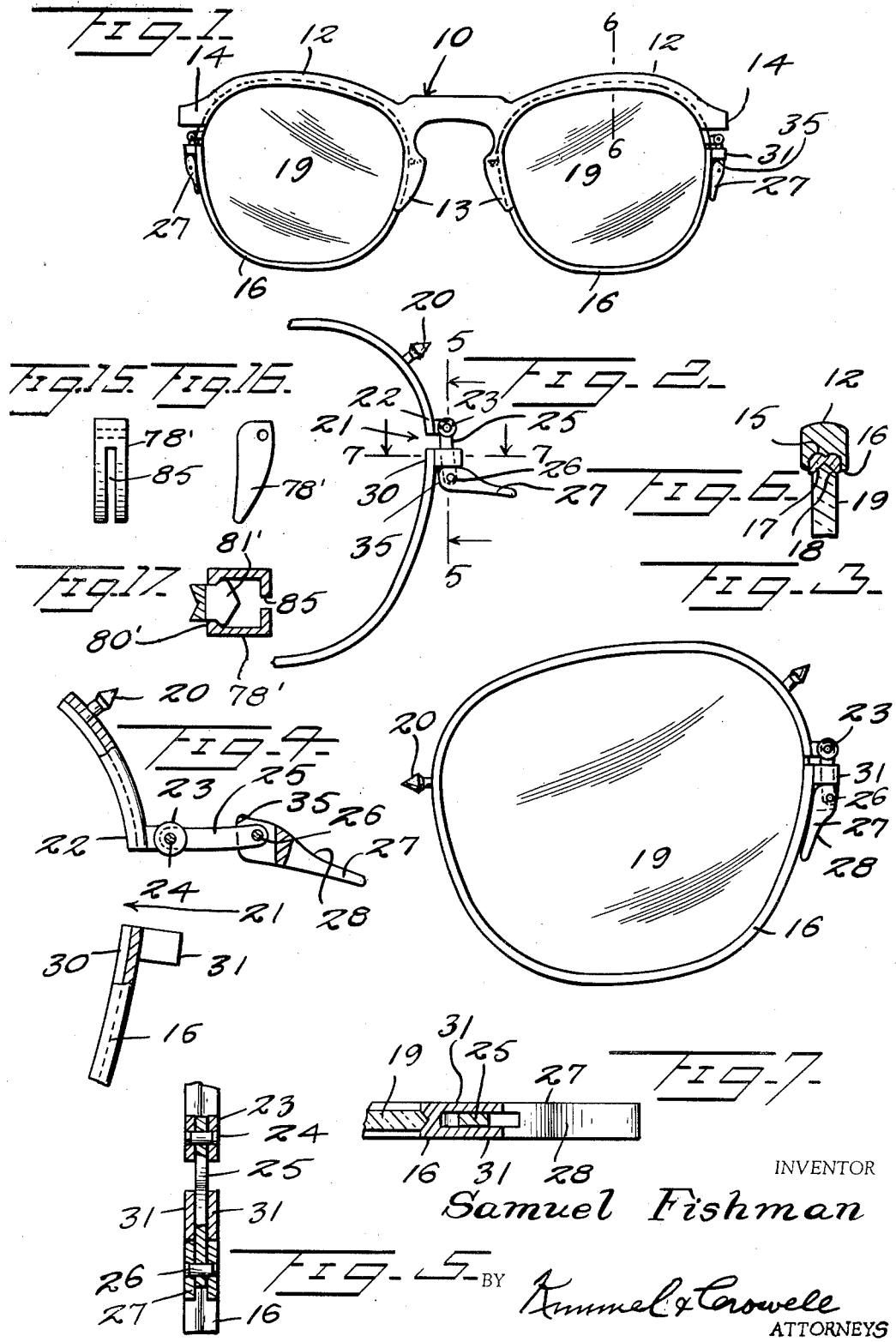

2,754,724
OPHTHALMIC MOUNTING

Samuel Fishman, West Englewood, N. J.

Application March 7, 1951, Serial No. 214,382

4 Claims. (Cl. 88—47)

This invention relates to an ophthalmic mounting, and has for its primary object the provision of an improved ophthalmic mounting of that type which obviates the necessity for the use of screws or similar fastening means.

As conducive to a clearer understanding of this invention it may here be pointed out that in the manufacture of spectacle frames where screws have been used, there has been constant difficulty and annoyance to spectacle wearers by reason of the screws becoming loosened and lost, and the consequent falling out and breakage of the lens. Even though the lens does not fall out loss of one of the minute screws occasions material difficulty since the very nature of such screws is such that their size is so minute as to render their recovery extremely difficult. Further, even if the screw is not lost, its replacement requires the use of a special screwdriver of very small size which is not always readily available.

An important object of this invention is, therefore, to obviate and eliminate the foregoing difficulties. It should here be pointed out that there is in common use today a type of spectacle frame which is becoming increasingly popular and which is known in the trade as a combination zylonite and metal mounting. In this construction, the top half of the frame is entirely or primarily comprised of zylonite, which is a form of plastic, while the lower half comprises either a half lens ring or rim or an entire lens ring or rim formed of metal and having a channel in the interior periphery for the reception of a lens edge and split to permit the insertion and/or removal of a lens therefrom.

Heretofore screws have customarily been used both to fasten the ends of the lens rim together and/or to secure the lens rim to the zylonite top. The present invention further obviates this and the foregoing difficulty by permitting the complete separation of the split ends of a lens rim or eye wire to permit the replacement of a lens and then drawing the ends together in clamped relation securely to fasten the lens within the rim and within the spectacle frame.

It may be pointed out that while there is above described a preferred embodiment of this invention, the connecting means for the split ends of the lens rim which comprises a basic feature of this invention may also be advantageously employed in connection with an all metal or all zylonite frame.

A further and more specific object of the invention is the provision of a readily separable and connectible lens rim which may be utilized under such adverse conditions as their use in military combat, wherein hitherto frequently a lost or loosened screw or broken lens has required the services of an optician resulting in a loss from combat of an otherwise operational individual. By means of the instant invention, a combatant may be provided with replacement lenses which he, himself, may readily replace in a minimum of time and with a minimum of difficulty, such lenses being worn, illustratively, in a container attached to his identification disc.

Still other objects reside in the combinations of elements, arrangement of parts, and features of construction, all as will be more fully pointed out hereinafter and disclosed in the accompanying drawings, wherein there are shown preferred embodiments of this inventive concept.

In the drawings:

Figure 1 is a front elevational view of the pair of spectacles of the so-called combination type including a zylonite top portion and a pair of metal rimmed lenses;

Figure 2 is a view of an individual rim, the connecting means therefor being shown in partially released or open position;

Figure 3 is a view similar to Figure 2, but showing the lens locking means in closed position;

Figure 4 is a fragmentary view of the lens rim showing the connector in fully open position;

Figure 5 is an enlarged sectional view taken substantially along the line 5—5 of Figure 2;

Figure 6 is a sectional view taken substantially along the line 6—6 of Figure 1;

Figure 7 is a sectional view taken along the line 7—7 of Figure 2;

Figure 8 is a front plan view of an all-metal form of spectacle embodying the connecting means of the foregoing modification;

Figure 9 is an enlarged fragmentary view partially in section and partially in elevation showing a locking means for the connecting means for the lens rim ends;

Figure 10 is a fragmentary enlarged sectional view taken substantially along the line 10—10 of Figure 9, as viewed in the direction indicated by the arrows;

Figure 11 is an enlarged fragmentary view partially in elevation and partially in section disclosing a further modification of the connecting means and a lock therefor;

Figure 12 is an enlarged sectional view taken substantially along the line 12—12 of Figure 11, as viewed in the direction indicated by the arrows;

Figure 13 is an enlarged sectional view taken substantially along the line 13—13 of Figure 11;

Figure 14 is a sectional view taken substantially along the line 14—14 of Figure 10;

Figure 15 is a modified form of lever construction similar to that of Figure 11;

Figure 16 is a top plan view of the lever of Figure 15; and

Figure 17 is a sectional view showing the lever of Figures 15 and 16 in engagement with a locking detent.

Similar reference characters refer to similar parts throughout the several views of the drawings. Referring now to the drawings in detail, and more particularly to Figure 1, there is generally indicated at 10 a zylonite half frame including a bridge 11 and opposite lens embracing upper sections 12, each provided at their opposite ends with adjacent nose engaging portions 13. The opposite end of each member 12 is provided with a projection 14 to which may be attached in any desired conventional manner a temple (not shown). The inner periphery of each of portions 12 and 13 is provided with a groove or channel 15 adapted for the reception and retention of a separable lens rim. Such rims take the form as shown in Figures 2 and 6 of annular metal bands 16 provided with an interior channel or concaved groove 17 adapted for the reception of edge 18 of a lens 19, edges 18 usually being beveled in a customary manner to permit their engagement in the grooves or channels 17. Each of the rims 16 is provided with one or more spaced lugs 20 on the upper periphery thereof which are engaged within the zylonite material of portions 12 or 13, the latter then being heated to insure a permanent connection between the lens rims and the frame 10.

As will become more apparent hereinafter such permanent connection may be readily accomplished and obviate the necessity for separable fasteners in this position in order that a lens may be replaced without replacement of the entire spectacle.

Each of the rims 16 is split as generally indicated at 21 in Figures 2 and 4, and one end 22 of each rim is provided with a pair of spaced apertured lugs 23 between which is connected as by means of a pivot pin 24 a link 25. The opposite end of each link 25 is connected as by means of a pivot pin 26 to a lever 27 which lever has on the side away from the lens rim an arcuate tapered surface 28 adapted to conform relatively closely to the configuration of the lens rim. The inner side of member 27 may, if desired, be provided with a channel or groove adapted to overlie the lens rim.

The end 30 of the split rim 16 opposite the end 22 is provided with a bifurcated member which is comprised of a pair of spaced substantially rectangular lugs 31, the link 25 being adapted when in end-engaging position to pass between lugs 31. It should be pointed out that the pivot 26 is off-center relative to the end of lever 27, the upper surface of which is provided with a projection 35 forming a cam surface which is adapted to coact with the under surface of the lugs 31 to form a lens locking device.

From the foregoing the operation of the latch should now be readily understandable. When a lens is broken or for other reason requires replacement it is only necessary to lift the lever 27 from the position of Figure 3 or locked position to that of Figure 2, whereupon by virtue of the cam 35 link 25 is permitted to slide upwardly between lugs 31 to permit expansion of lens rim 16 and thus the removal of or reinsertion of a conventional lens.

In the event that the separation permitted by the length of link 25 is not sufficient for any reason the link may be swung outwardly to the position of Figure 4, whereupon the entire lower portion of lens rim 16 may be swung downwardly to such position as will permit the insertion of any reasonable sized lens.

Obviously after insertion of the lens the link 25 is repositioned between the bifurcations 31 in the position of Figure 2 and lever 28 moved downwardly to the position of Figure 3, the cam surface 35 serving through its engagement with the under surfaces of lugs 31 effectively to lock the new lens in position.

Referring now to Figure 8, there is disclosed a pair of spectacles comprising lenses 40 surrounded by rims 41, the rims being of all-metal type and each being separable as indicated at 42. The all-metal rims are similar in cross-section to the previously disclosed rim portion 16, and are provided at an appropriate point with extensions 43 to which temples 44 are connected. Rims 41 are connected by a conventional bridge 45 and are provided with conventional nose pads 46. The connecting means generally indicated at 47 for the separable ends of the rims are identical with that of the previously discussed modification.

Referring now to the modification disclosed in Figures 9 and 10 and 14, there is shown a lens 50 surrounded by rim 51 provided with headed pins 52 engageable in a zylonite half frame 53 substantially identical to that shown in Figure 1. The lens 50 is surrounded by a rim 54, separable as indicated at 55, and has one end provided with lugs 56 to which is pivotally connected, as by a pivot 57, a link 58 which passes between spaced lugs 59 on the other end of the rim. Link 58 is pivotally connected as by a pivot 60 to a lever 61, provided with a cam surface 62 for engagement with lugs 59, the operation being substantially identical to that of the previously described modification. The lever 61 in this form is, however, provided with a venturi shaped aperture or keeper 63 extending therethrough and secured to the rim 54 adjacent aperture 63 is a headed detent 54. Detent 65 is angularly inclined relative to rim 54 in a direction away from lugs 59 to facilitate the insertion of the head 66 thereof into aperture 63. It will thus be readily apparent that when the lever 61 is moved to rim closing position, head 66 of detent 65 will pass into and through the aperture, to form a substantially continuous flush surface on the outer side of lever 61. Obviously, the head 66 will serve securely to hold lever 61 against rim 54 unless substantial pressure is deliberately exerted on the projecting end of the lever to disengage the parts.

Having reference now to the modification disclosed in Figures 11 to 13, inclusive, there is shown at 70 a lens provided with a rim 71, the latter being separable as at 72 and provided at one end with spaced lugs 73 to which a link 74 is pivotally connected as by a pivot 75. The opposite end of link 74 is adapted to pass between a pair of projecting lugs 76 when in closed position and pivotally connected as by a pivot 77 to a lever 78. All of the foregoing parts, with the exception of the lever 78, are substantially identical to those of the preceding modification. In this form the lever 78 is channel-shaped in cross-section, but in longitudinal configuration is similar to the lever 27 and is provided at the ends of its side walls with spaced cam surfaces 79 which curve inwardly as at 78$^b$ to engage the lugs 76. At an intermediate point adjacent the free end of lever 78, the open face thereof is partially bridged by a pair of spaced arcuate keeper forming flanges 80. Portions 78$^a$ of the side walls of lever 78 overlie the sides of rim 71 (see Fig. 11) and serve as guides to center lever 78 relative to rim 71. A detent 81 is mounted on rim 71 at a point adjacent the flanges 80, and the arrangement is such that when lever 78 is moved to rim closing position, the lever is sufficiently resilient to cause flanges 80 to separate to an extent to admit the head of detent 81. It will be readily apparent that the head 81 engaging the inner side of flanges 80 securely holds the lever 78 against accidental disengagement.

Still another modification similar to that of Figures 11 to 13 is disclosed in Figures 15 to 17. In this modification there is shown a channel shaped lever 78′ similar in side elevation to lever 78 but provided on its underside in place of flanges 80 with relatively rigid short flanges 80′. The free end of the lever is open and there is provided a longitudinally extending slot 85 along the top thereof. A detent 81′ similar to detent 81 having a head 86 similar to that of detent 80 is adapted to slide longitudinally between flanges 80′ as shown in Figure 18, slot 85 allowing resilient separation of the ends of lever 78′. It will thus be seen that this modification also securely locks the lever adjacent the rim in rim closed position to avoid accidental displacement thereof.

In principle and operation, all of the above modifications operate in a manner similar to that previously disclosed.

From the foregoing, it will now be seen that there is herein provided an improved ophthalmic mounting which accomplishes all the objects of this invention and others including many advantages of great practical utility and commercial importance.

An ophthalmic unit as referred to in the appended claims shall be defined as being comprised of a pair of lens rims or eye wires, each adapted to receive and hold a spectacle lens by means of the securing element embodied hereinbefore whether mounted in a complete pair of spectacles or made separately from the temples and mounting rim therefor.

As various embodiments may be made of this inventive concept and as various modifications may be made in the embodiments hereinbefore shown and described, it is to be understood that all matter herein is to be interpreted merely as illustrative and not in a limiting sense.

I claim:
1. In an ophthalmic mounting, a split eye wire, a pair of spaced lugs fixed to each end of said eye wire, and extending outwardly therefrom a link pivotally secured at one end between one pair of said lugs, said link in the closed position of said eye wire engaging between the other pair of said lugs and having its other end extending therebeyond, a latching lever pivotally secured at one end to said other end of said link, said pivot being off center relative to said other end and a projection forming a cam surface carried by said one end of said lever on the outer side thereof, said projection upon swinging of said link between said other pair of lugs engaging adjacent edges of said other pair of lugs whereby inward swinging of said lever toward said eye wire will cause said cam to force said pairs of lugs toward each other and thereby close said eye wire.

2. In an ophthalmic mounting, a split eye wire, a pair of spaced lugs fixed to each end of said eye wire and extending outwardly therefrom, a link pivotally secured at one end between one pair of said lugs, said link in the closed position of said eye wire engaging between the other pair of said lugs and having its other end extending therebeyond, a latching lever pivotally secured at one end to said other end of said link said pivot being off center relative to said other end, a projection forming a cam surface carried by said one end of said lever on the outer surface thereof, said projection upon swinging of said link between said other pair of lugs engaging adjacent edges of said other pair of lugs whereby inward swinging of said lever toward said eye wire will cause said cam to force said pairs of lugs toward each other and thereby close said eye wire, and cooperative means carried by said lever and said eye wire for locking said lever in latching position.

3. An ophthalmic mounting as set forth in claim 2 wherein said cooperative means includes a headed detent carried by said eye wire and a keeper carried by said lever.

4. An ophthalmic mounting as set forth in claim 2 wherein said lever is channel shaped in transverse section, and said cooperative means included a headed detent carried by said eye wire and confronting keeper forming flanges carried by said lever engageable with said detent.

References Cited in the file of this patent

UNITED STATES PATENTS

| 930,840 | Coleman | Aug. 10, 1909 |
| 1,800,263 | Nerney | Apr. 14, 1931 |
| 1,925,368 | Bouchard | Sept. 5, 1933 |
| 2,112,644 | Bausch | Mar. 29, 1938 |
| 2,350,338 | Casavant | June 6, 1944 |
| 2,362,002 | Gluck | Nov. 7, 1944 |
| 2,367,389 | Ditto | Jan. 16, 1945 |
| 2,593,932 | Stegeman | Apr. 22, 1952 |

FOREIGN PATENTS

| 89,954 | Germany | Jan. 4, 1897 |
| 356,566 | France | Dec. 4, 1905 |